United States Patent [19]

Liu

[11] Patent Number: 5,953,005
[45] Date of Patent: Sep. 14, 1999

[54] SYSTEM AND METHOD FOR ON-LINE MULTIMEDIA ACCESS

[75] Inventor: James C. Liu, Sunnyvale, Calif.

[73] Assignee: Sun Microsystems, Inc., Mountain View, Calif.

[21] Appl. No.: 08/671,581

[22] Filed: Jun. 28, 1996

[51] Int. Cl.[6] ........................................................... G06T 1/00
[52] U.S. Cl. .......................... 345/302; 380/25; 434/307 A
[58] Field of Search .................... 707/501, 513, 707/529, 542; 345/302, 329, 335, 326; 434/307 R, 307 A; 463/30–35; 395/200.47, 200.48, 200.49, 200.33, 187.01, 186; 380/23, 25

[56] References Cited

U.S. PATENT DOCUMENTS

| | | | |
|---|---|---|---|
| 5,561,849 | 10/1996 | Mankovitz | 455/45 |
| 5,572,643 | 11/1996 | Judson | 395/200.48 |
| 5,613,909 | 3/1997 | Stelovsky | 463/1 |
| 5,654,516 | 8/1997 | Tashiro et al. | 84/601 |
| 5,663,515 | 9/1997 | Kato | 84/609 |
| 5,706,427 | 1/1998 | Tabuki | 395/187.01 |
| 5,742,762 | 4/1998 | Scholl et al. | 395/200.3 |
| 5,761,309 | 6/1998 | Ohashi et al. | 380/25 |
| 5,790,548 | 8/1998 | Sistanizadeh et al. | 370/401 |

Primary Examiner—Joseph H. Feild
Attorney, Agent, or Firm—Conley, Rose & Tayon, PC; B. Noel Kivlin

[57] ABSTRACT

A method and system for providing access to multimedia content on-line which is updated virtually simultaneously with the vendor's update process. By a user accessing a page on the World Wide Web, for example, data (encrypted and unencrypted) and instructions are automatically downloaded to a user's computer system for quick access. Depending upon the user's computer system (LAN or a stand-alone personal computer), "applets" containing data and instructions are stored for immediate access. In a Karaoke application of this invention, where the user desires to access songs which are most popular at a given time, the user accesses a page where a song list and other information is displayed on a display apparatus. When the user clicks on a particular song of the song list, the applet executes an authentication request. If the user is authenticated, the authentication is downloaded as part of the applet containing the desired multimedia content (or separately depending upon the circumstances). According to this invention, an applet includes multimedia elements which further include timing codes and a synchronization function which provides for the synchronization of the delivery of the multimedia elements.

45 Claims, 10 Drawing Sheets

Javaoke Flow Diagram

SYSTEM AND METHOD FOR ON-LINE MULTIMEDIA ACCESS

FIELD OF THE INVENTION

This invention relates to access to encrypted multimedia content data over an Internet-type distribution system, and more particularly to a way to improve a user's on-line multimedia experience.

BACKGROUND OF THE INVENTION

Traditional forms of entertainment are becoming increasingly digitized and accessible to a wider audience. For example, in Japan, a popular form of entertainment, Karaoke, is available to a wider participating audience as a result of digitization. Because digitization reduces the cost of many products and services, Karaoke "juke boxes" are found in many business establishments so that their patrons may enjoy their use.

Digitized Karaoke juke boxes are an improvement over traditional juke boxes. Instead of replacing vinyl records, a service technician visiting each site simply loads software to update the song choices available to the user with the latest music. Moreover, on a display, words can be scrolled at the same time as the music plays. This multimedia Karaoke experience, while an improvement over traditional juke boxes, however, is expensive since it requires service calls by technicians for updating. Moreover, there is a lag between the release of a song and the time it is installed on a Karaoke juke box. Furthermore, the Karaoke song list books are printed on paper and thus are easily lost, damaged or destroyed. Additionally, in accounting, it is difficult to keep track of the songs which have been played so that royalties may be paid to the artists. A new method and apparatus which does not require visits by technicians to Karaoke sites and resolves the other problems described above would be beneficial.

While Karaoke is enjoyed by patrons of business establishments, home Karaoke participation is currently limited to playing and singing along with a record or CD. Some of the disadvantages to a home Karaoke participant include that he/she must leave home to purchase the music content and that he/she does not have the sing-along aid of scrolling words.

As more users access the Internet and the associated World-Wide-Web, more vendors are providing multimedia content data which is readily accessible by consumers. Depending upon the bandwidth capability of the transmission hardware, among other things, different types of content are accessible by consumers, including video, audio, graphic and ASCII data. Moreover, particularly with the advent of browser technology, such as Netscape, a user can readily access data from servers all over the world.

Recently, new programming languages have been developed which allows programs to be written which enhance browser technology. While not widely used yet, programs which are written in these languages can be embedded into a browser and promise to provide a user with a nearly seamless on-line multimedia experience. Such a language, Java (TM) language, has been developed by Sun Microsystems'(R) Computer Corporation.

Java is an object-oriented language similar to C++ in many ways, but specifically developed to provide cross-platform capability and reduce the complexities of C++. Generally speaking, an object-oriented language facilitates the clean definition of interfaces and makes it possible to provide reusable "software ICs." Java provides multimedia capabilities which are operating system and hardware independent. The Java software architecture is designed to support platforms ranging from personal computers to embedded network devices of the type similar to a Java desktop device (recently announced by Sun and Oracle). Sun Microsystems has a Java homepage where the Java language specifications can be accessed among other instructive programming materials at Http://JAVA.SUN.COM/doc/Overview/java/index.html.

It would be beneficial to both commercial and home users for the distribution of Karaoke and other multimedia content to be provided on-line by an Internet-type distribution system.

SUMMARY OF THE INVENTION

A user of this invention is able to access multimedia content on-line which is updated virtually simultaneously with the vendor's update process. In the event that a vendor updates the data frequently, the user will benefit tremendously, never experiencing a lag between the newest content and the delivery thereof. By a user accessing a page on the World Wide Web, for example, data (encrypted and unencrypted) and instructions are automatically downloaded to a user's computer system for quick access. Depending upon the user's computer system (LAN or a stand-alone personal computer), "applets" containing data and instructions are stored for immediate access. An applet in and of itself may contain a plurality of components, and a single click by the user may generate a download which fetches a plurality of applets. In any case, the applets are available for virtually immediate execution, making the multimedia experience seamless to the user.

For example, in a Karaoke application of this invention, where the user desires to access songs which are most popular at a given time, the user is completely unaware of the automatic delivery of an applet including data and instructions from a main data base server. When the user accesses a page, a song list and other information is displayed on a display apparatus. When the user clicks on a particular song of the song list, the applet executes an authentication request. If the user is authenticated, the authentication is downloaded as part of the applet containing the desired multi media content (or separately depending upon the circumstances). In the meantime, a new song may have reached number one standing in the charts, and the vendor has updated the main data base accordingly. While the user is still on the page, an applet containing a new song list is downloaded to user's computer system, so that in the near future, when the user goes to click another song for playing, the song list is updated and includes the newest and most popular songs.

A multimedia experience, inherent in its nature, will include different types of media content. For a seamless experience, each element's timing must be coordinated with the other elements' timing. According to this invention, an applet includes multimedia elements which further include timing codes and a synchronization function which provides for the synchronization of the delivery of the multimedia elements.

DETAILED DESCRIPTION OF THE INVENTION

A user wishing to access a Karaoke application provided in accordance with this invention will access a Karaoke page via a browser such as Netscape. The browser supports Java so that the use of Java provides multimedia capabilities which are operating system and hardware independent. Accordingly, an applet including encrypted and unencrypted data and instructions will be delivered to the user's computer system to enable the user to make choices and thus send a request to a remote server for the delivery of multimedia content. Once authentication has taken place, one or more applets are sent by the remote server which deliver the multimedia content.

Figure 1:
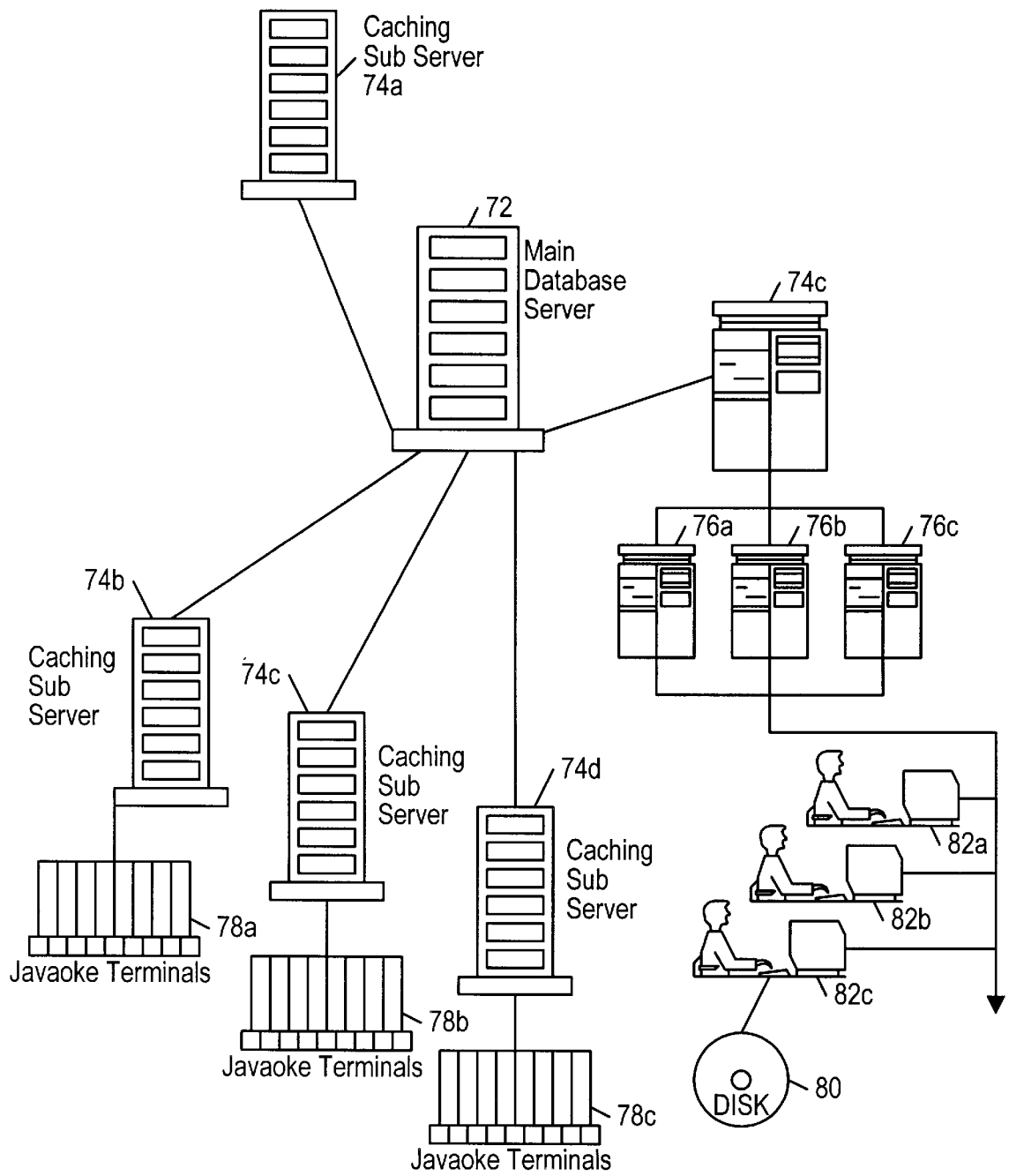
FIG. 1 is an overview of a distribution system used in conjunction with this invention.

Applets are stored in a network of servers for efficient delivery to a user. FIG. 1 shows a main database 72 in communication with caching subservers 74a, 74b, 74c, 74d and 74e. The main server defines the master database of all songs released. This database can rely on any known database technology whose hardware will usually reside at the central distribution site for data defined by the implementor. Multiple main servers are permitted for redundancy.

Caching subservers define a location specific server which caches songs for distribution to local Karaoke clients. The purpose of the caching subservers is to reduce load on the main server generated by song requests, and reduce long distance network traffic to the main server by caching songs locally. If a caching server does not have in memory, a song, it will request it from the master list. Subserver 74e is further shown in communication with subservers 76a, 76b and 76c. Networked computers may be arranged in other configurations as well.

An array of dedicated Karaoke terminals 78a, 78b and 78c are in communication with subservers 74b, 74c and 74d respectively. The Karaoke terminal plays the songs but also may include, but is not required to have digital signal processing capability, stereo sound, remote control, a keyboard and a mouse. Alternatively, the Karaoke page is accessed, for example, by a user's personal computer, LAN, laptop, PDA, workstation, television or telephone 82a, 82b or 82c, wireless or wired. In any manner of transmission from a remote source, applets are automatically downloaded onto the user's computer system upon access to the page as described above.

Figure 2:
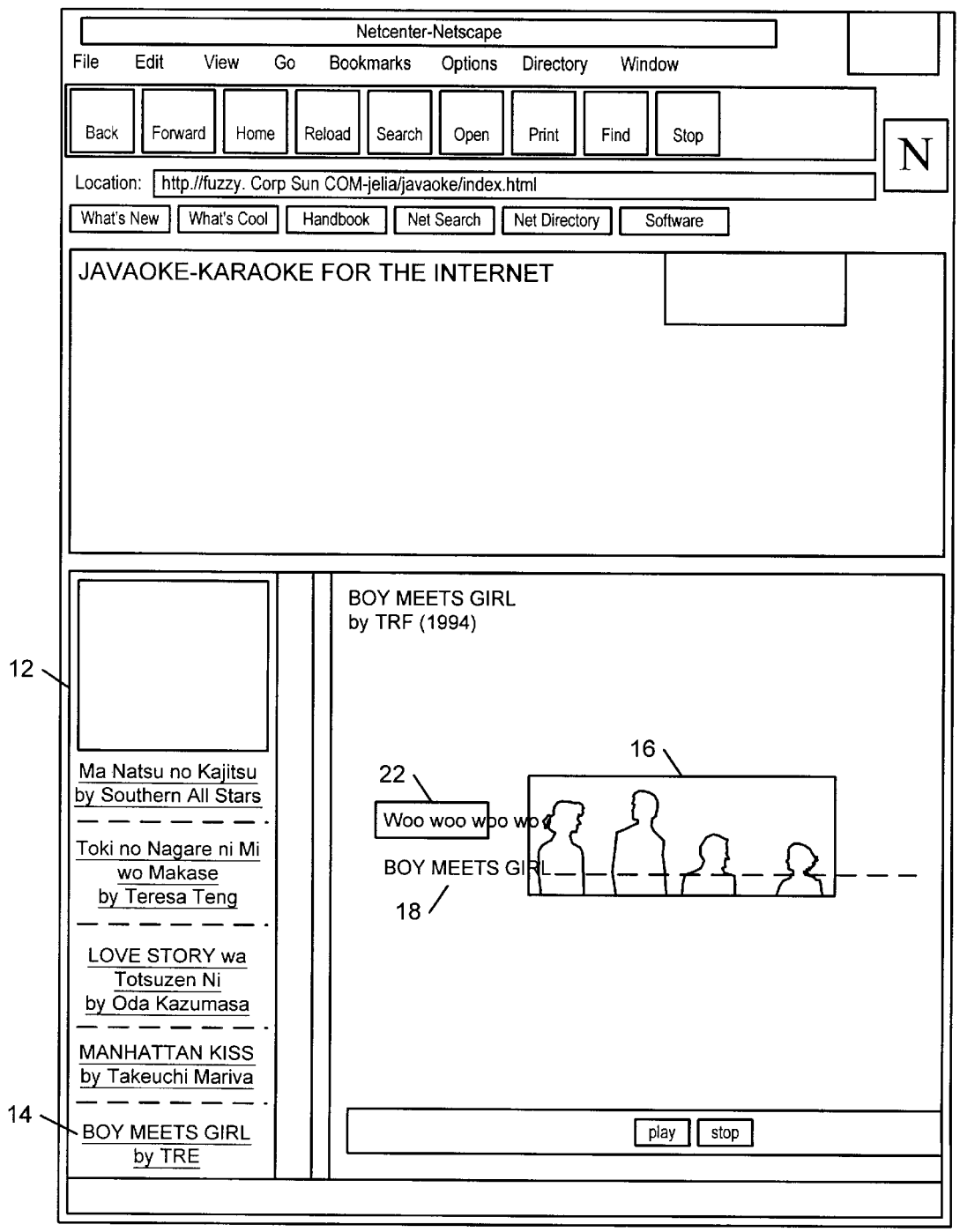
FIG. 2 shows display screen output, among other things, offering a user song choices for a Karaoke application of this invention.

Turning to FIG. 2, an example of a Karaoke page 10 on a display apparatus is shown. The user will view a song list 12 such as that shown on the left side of page 10. While the user scrolls the song list, various information is provided. For example, a song's standing in the charts at that particular time, its length and any other information pertinent to the song is optionally provided. Because a song's current standing in the charts is information which can change at any given moment, such information when available is automatically downloaded to the user while the user maintains access to the page. New songs which are released may also be downloaded to the user while the user maintains access to the page. Moreover, as the user is scrolling through the song list, still photographs or video clips of the performances by the artists are also provided.

The user will use the click of a mouse, or other input device, to choose a song 14 on the song list 12. As shown in FIG. 2, a user chose the song Boy Meets Girl by TRF. To the right side of the song list on the page, graphics, animation or a video 16 by the group TRF are shown. As the song plays, the words to the song are also displayed. As shown in FIG. 2, the words are "Woo woo woo wo, BOY MEETS GIRL."

As the song continues to play and new verses are sung by the performer, the words displayed will change. Words (ASCII data) 18 may be displayed, for example, in segments or one at a time. In either event, the words displayed are synchronized with the words sung by the performer. In the case where a segment of words is displayed, the words on the screen are simultaneously highlighted against the background 22. Highlighting may instead be provided, for example, in a traditional bouncing ball format. An applet delivering multimedia content in accordance with this invention therefore includes the multimedia content data as well as instructions for providing the synchronization of different multimedia elements as will be described in detail below with reference to FIGS. 8–10.

Figure 3:
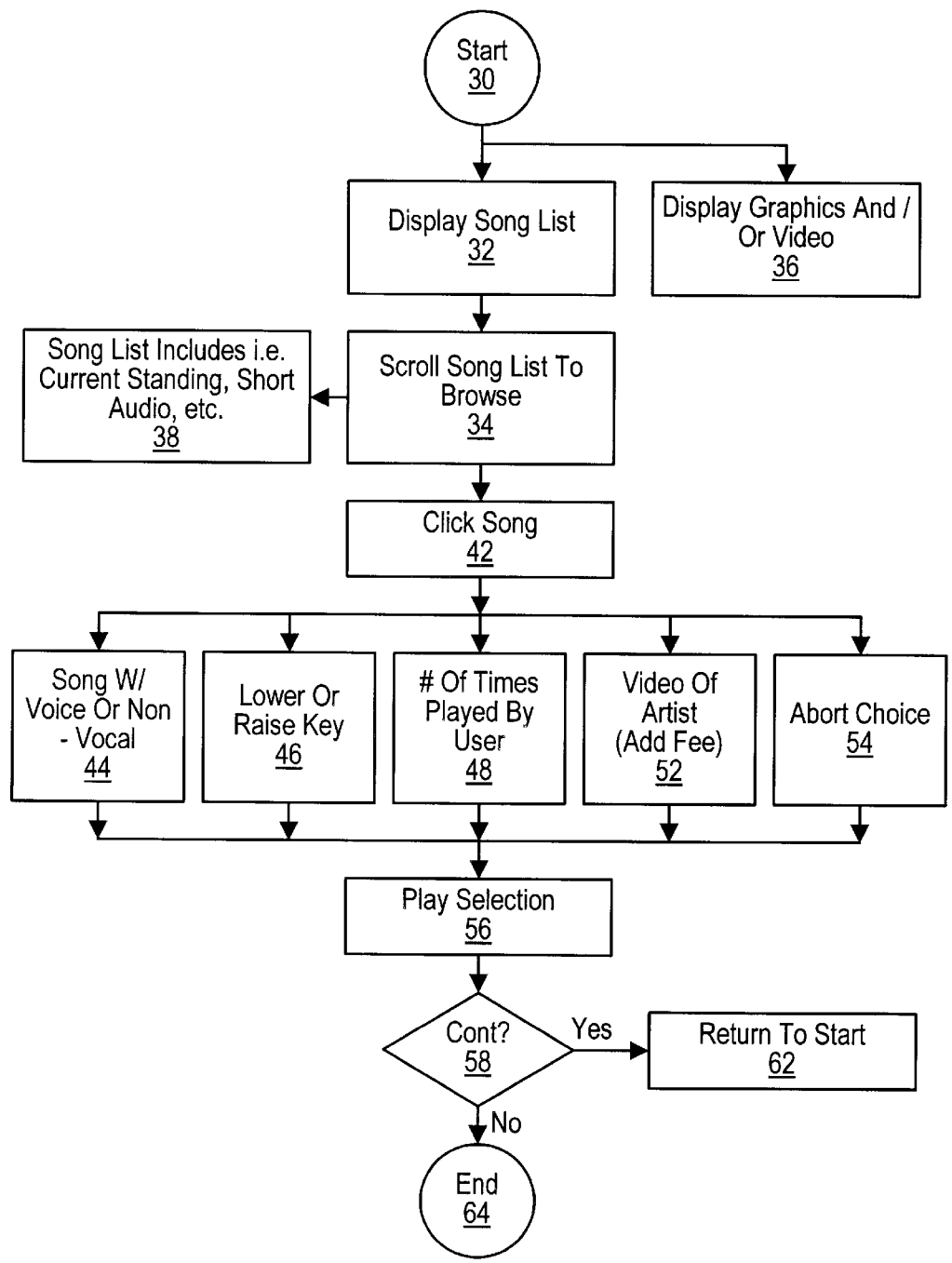
FIG. 3 is a flow chart of choices provided to a user in a Karaoke application.

The initial applet or applets delivered to the user may provide a number of choices to the user. The flowchart of FIG. 3 shows steps to carry out a selection process provided by the initially delivered applet or applets. When the user accesses a Web page 10 at box 30, he/she may make a choice from ASCII song list 14 at box 32. As mentioned above, components such as graphics, video and audio may also be delivered by an initial applet at box 34. Thus, as the song list scrolls at box 34, graphics, video, audio cuts from the songs or ASCII data such as a song's current standing may be accessed at boxes 36 and 38. Having decided upon a song, the user clicks to indicate his/her choice at box 42. User options include whether the song should be played with or without vocals at box 44; whether to raise or lower the key at box 46; a record of the number of times the song has been played by the user at box 48; whether to display video or graphics by the artist for an additional fee at box 52; whether to abort choice at box 54. Alternatively, the choices between boxes 44–54 may be suppressed or not offered. The selection is played at box 56. Once concluded, at box 58 the choice of whether to continue or to end is provided at boxes 62 and 64 respectively. Moreover, one of the above described user option boxes can include other features, such as to choose the language in which the vocalization is sung, for example, English or Japanese; whether the voice is female or male, tenor, alto or soprano; whether the voice is to sing a harmony with the original base melody; or whether to change the tempo or style of the song, for example, to a rap version, a easy listening version or country version.

After an initial applet is delivered, the multimedia content is delivered upon request, providing that the user has been authenticated. Turning to the flow chart of FIG. 4, when the user clicks on a home page with the browser, a server delivers the most current applet at boxes 84 and 86. After the song selection at box 42 (see FIG. 3) the applet calls back to the database (stored on main server 72 or a subserver) to request audio, video, timing and lyric information at box 88. At box 92, to deliver the content in a synchronized manner, the applet forks threads of control to fetch various data as shown the next boxes, 94, 96, 98, 102 and 104. At box 106, when the data is delivered to the user's computer system, it is assembled and played.

Since the delivered content data is encrypted, a key is needed for a user to decrypt it. The key may have been delivered with the initial applet or later. In any event, the key will not be provided to the user until the user has been authenticated. Authentication, for example, includes verifying payment data, a user password or a handshake with a form of personal identification such as a PCMCIA-based card, for example, a credit, debit, prepaid cash card or smart card.

Figure 4:
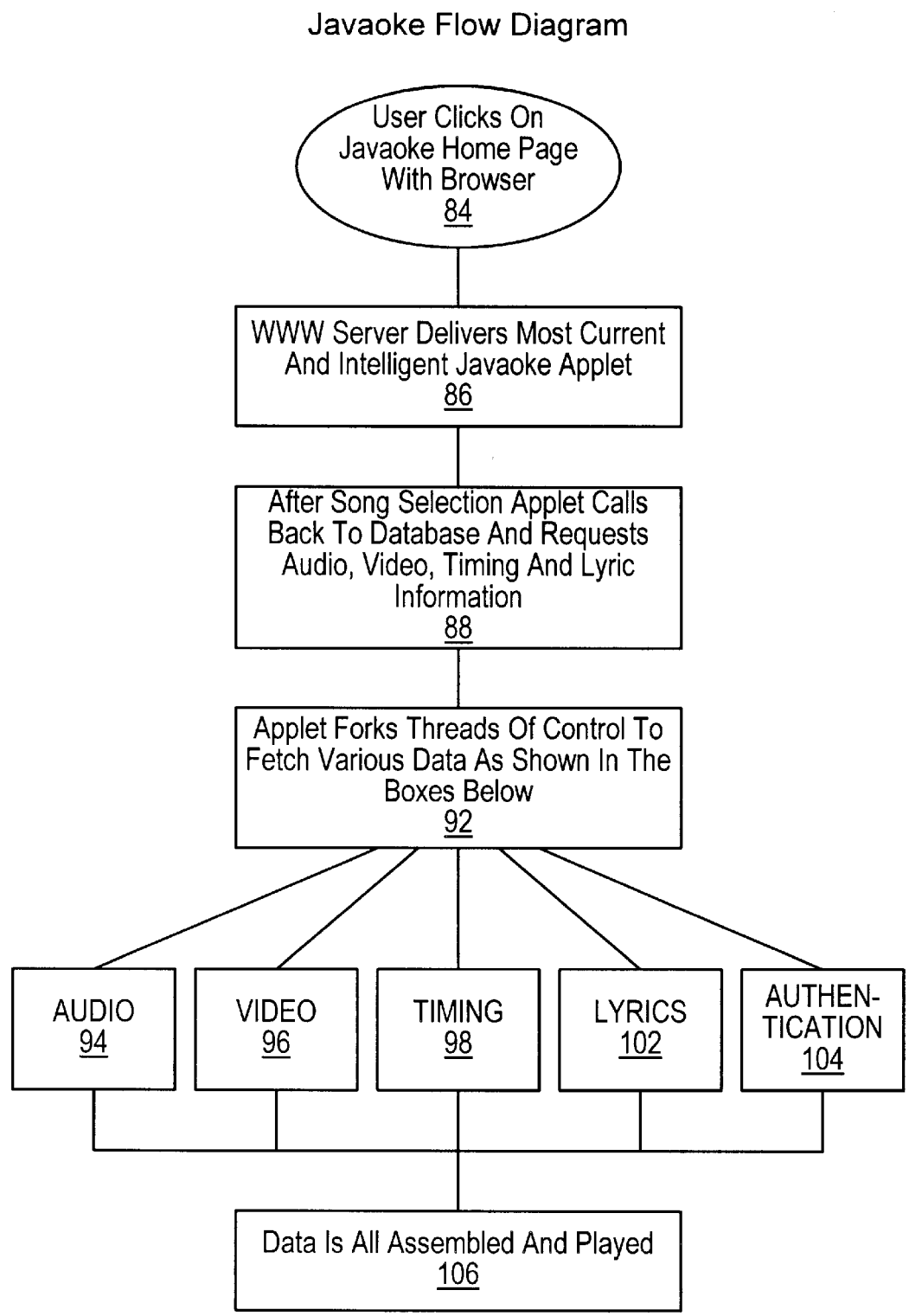
FIG. 4 is a flow chart illustrating the threads for delivery of the different multimedia content components.
Figure 5:
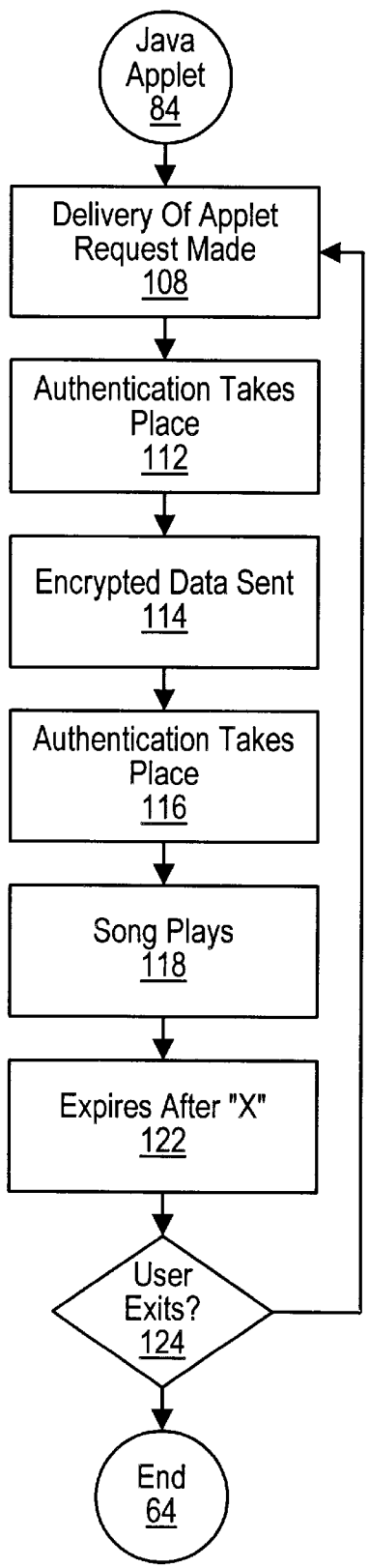
FIG. 5 is a diagram illustrating the embedded nature of Java in a browser.
Figure 6:
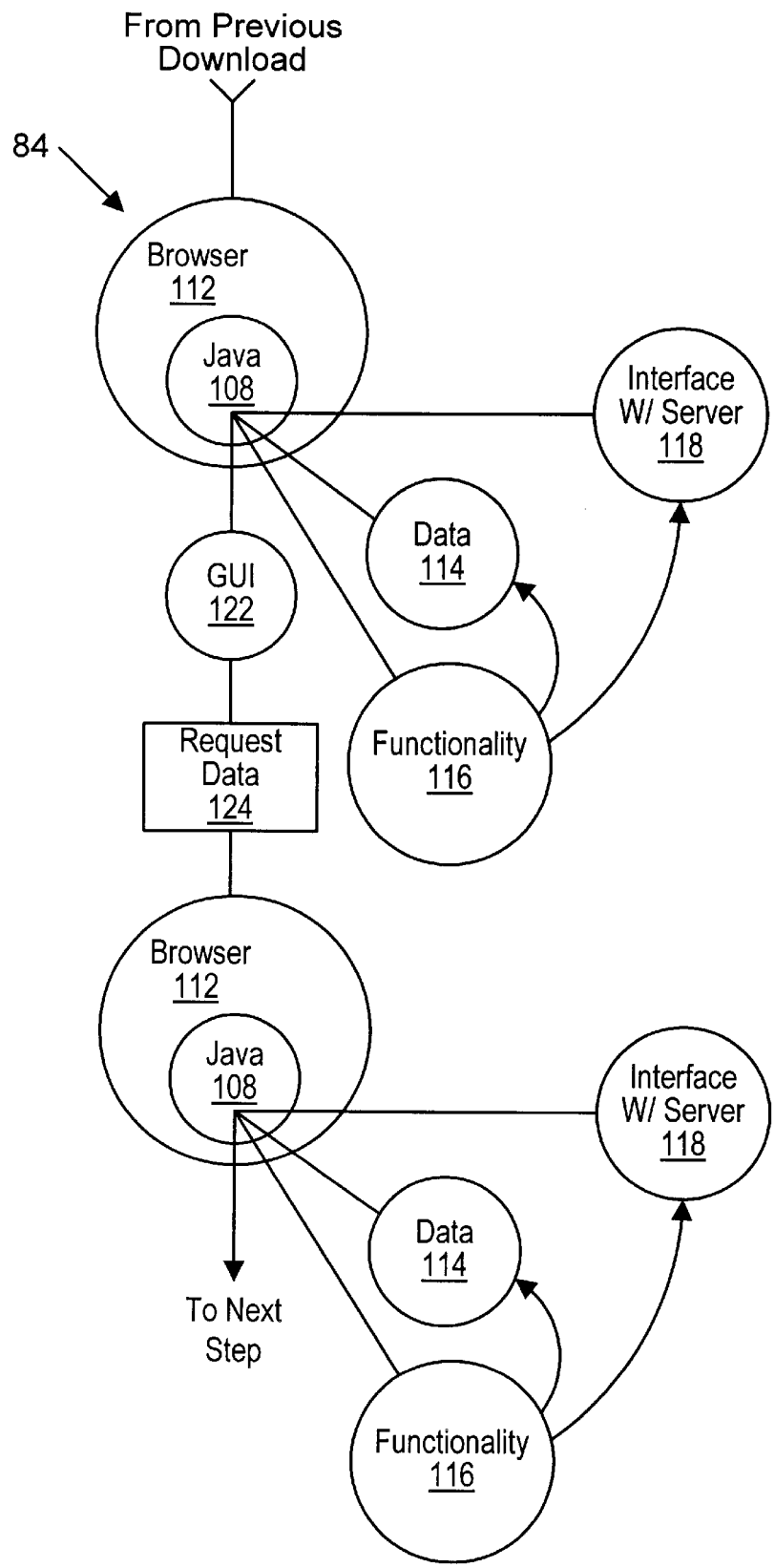
FIG. 6 is a flow chart illustration the authentication procedure of this invention.

FIG. 6 is a flowchart of the authentication thread 104 of FIG. 5. The authentication of this invention includes cryptographic portion and security access portions that control permissions for users to access songs, registration of usage of songs, data encryption of digital data, and valid usage lifetime of encrypted data (cf. http//www.omg.org follow links to security API for CORBA). That is, after an initial applet is delivered, and a user makes a choice and a request at box 108, authentication may be delivered before, at the same time or after the multimedia content elements are delivered depending on, for example, where particular threads of the applet shown in FIG. 4 are stored. Encrypted data is downloaded to the user at box 114 and stored on the user's computer system.

Upon authentication, a key is provided to the user to decrypt the multimedia content data so that the song plays at box 118. Depending upon the Karaoke business operation, the key may be disposable and therefore expire immediately upon decrypting the data, or may expire after a predetermined number of plays or within a time period such as twenty-four hours at box 122. With the ease of delivery of applets, a plurality of keys may be downloaded to a user's computer system in a manner invisible to the user. Moreover, as disposable keys are used, replacement keys are sent to the user's computer system for use later during the session. Once the user logs off page 10 at box 126, applets are removed from the user's computer system's memory. In this manner, piracy of content is particularly difficult since one key will decrypt encrypted data for one song which can expire after one play. Accordingly, access is more secure and thus multimedia content is better protected.

As mentioned above, Applets may be updated by the vendor and then automatically downloaded at any given time by the server. Turning to FIG. 6, an overview of particular elements of an applet is shown. As discussed above, Java applets 108 are embedded in the browser 112. The applet elements include data 114 and instructions 116 (functionality) which acts upon the data. The data is either unencrypted or encrypted data, the latter of course needing a key for the user's access.

The functionality 116 is provided by a set of instructions operating on applet data 114. Digital signal processing (DSP) functionality includes features shown in FIG. 3 used to lower or raise the song's key (box 46), to choose a song with or without vocals (box 44) or to slow or speed the song's tempo. Compression of data (and therefore its decompression) is also provided by the functionality of the applet. Where the data has been stored in, for example, a MIDI format (see FIG. 10), decompression instructions are an applet component. The authentication process as well as the associated activation of keys are also functionalities provided by the applet.

The functionality 116 instructions also act as an interface 118 to provide access to the server via common object request broker architecture (CORBA) (cf. http://www.omg.org). This is the open standard by which authentication and messaging between a Karaoke terminal and any server will communicate. When a song selection is made by the user, instructions 116 makes a request of the server. In responding, the system is able to keep track of how many times a particular song was requested. In this way, the vendor is able to keep track of the royalties due to the artist, the market demographics by region and thus age and income level so that pricing structures can better reflect the actual playing of the song. The interface with the server 118 can cause prompts for the user at the graphical user interface (GUI) 122. Moreover, once a user has accessed the page 10 and applets are being downloaded, the interface 118 can signal to bring in more applets at appropriate times, for example, to offer coupons for goods or services which can be printed on the user's printer or electronically stored for use on-line or to make other offers such as concert tickets or entries into contests. In this manner data request box 124 makes the request to the server so that another applet is subsequently downloaded on the user's system to satisfy the request.

Figure 7:
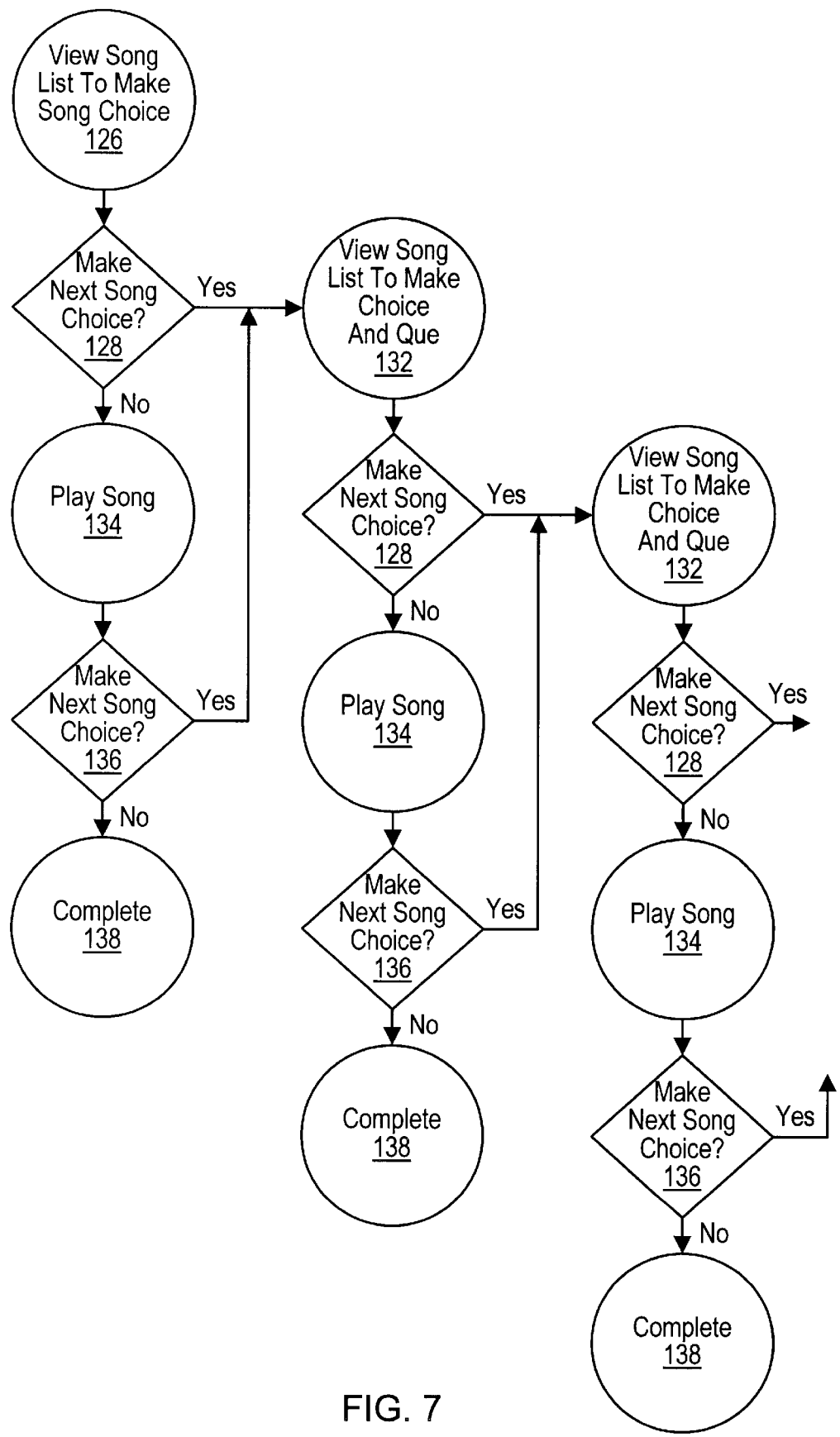
FIG. 7 is a flow chart illustrating the choose and play sequence of this invention.

Depending upon the circumstances, a user will either request a song or request a series of songs. Turning to FIG. 7, a flow chart is shown providing for the simultaneous play and search capability of this invention. The song list 12 (see FIG. 2) is review by the user and the user makes a song selection at box 126. A prompt for the next song selection is provided at box 128. The user may make the selection to queue the song at box 132. If the user chooses not to make the next selection, the chosen song plays or continues to play at box 134. While the song continues to play, the selection prompt is still available to the user so that he/she may make the next song choice before the first song is over or at its completion at box 136. In the event the first song is still playing, the next song is put into a song queue at box 132. In the event that the first song is completed and no other song choices are made, then the program is complete at box 138. This process, as shown in FIG. 7, can be repeated so that a user can queue an entire song repertoire before the activation of the first play or while the play is proceeding. In the meantime, as discussed above, the vendor may have updated the song list and new applets and/or data are being downloaded to the user's system so that song choices are updated in a seamless manner.

As discussed above with reference to FIG. 4, this invention includes instructions to generate and control multimedia content output including audio output from an audio data element, ASCII output from an ASCII data element and graphics output from a graphics data element, wherein the ASCII output and the graphics output are displayed on a display apparatus, the combination of which is delivered in a synchronized manner with the audio output in accordance with a timing data element. Also as mentioned above, the Karaoke applets run inside a browser, providing for the user selection of a song, downloads audio, downloads the video images, downloads the ASCII lyrics and downloads the timing data. Each download occurs using a separate thread of control for asynchronicity and better bandwidth usage. Pressing the "play" button causes the song to play. Pressing the "stop" button halts the play. Each time play is pressed, timing resynchronization with the words occurs. This invention can support multiple types of timing synchronization providing varying qualities of service. Below, three types are discussed.

Figure 8:
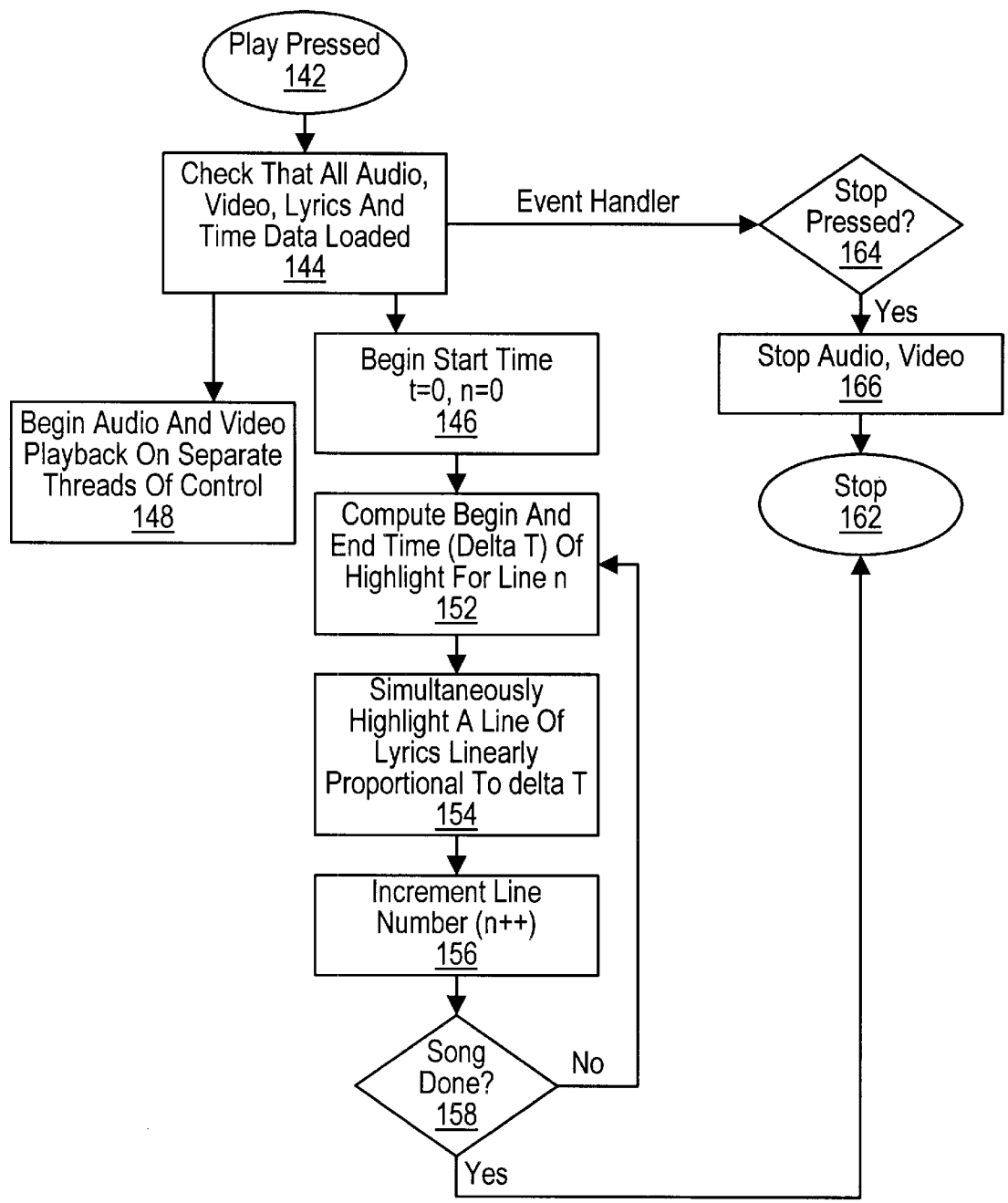
FIG. 8 is a flow chart illustrating a method of synchronization of multimedia elements.

Referring to FIG. 8, play is input by the user at box 142. A check is made that all the audio, video, lyrics and time data are loaded at box 144. The audio data include any form of digital audio data, such as .au, .snd, .aiff, etc. file formats. Audio data also includes MIDI format audio, and any compression of the audio. The video data include picture based formats (.gif, .jpg, etc.) and any other motion picture format data such as mpeg and .avi. The timing data defines the list of times that are associated with the vocalization of words within a song. The text data in both single-byte and double-byte (internationalized and localized fonts) of the words to a song.

Figure 9:
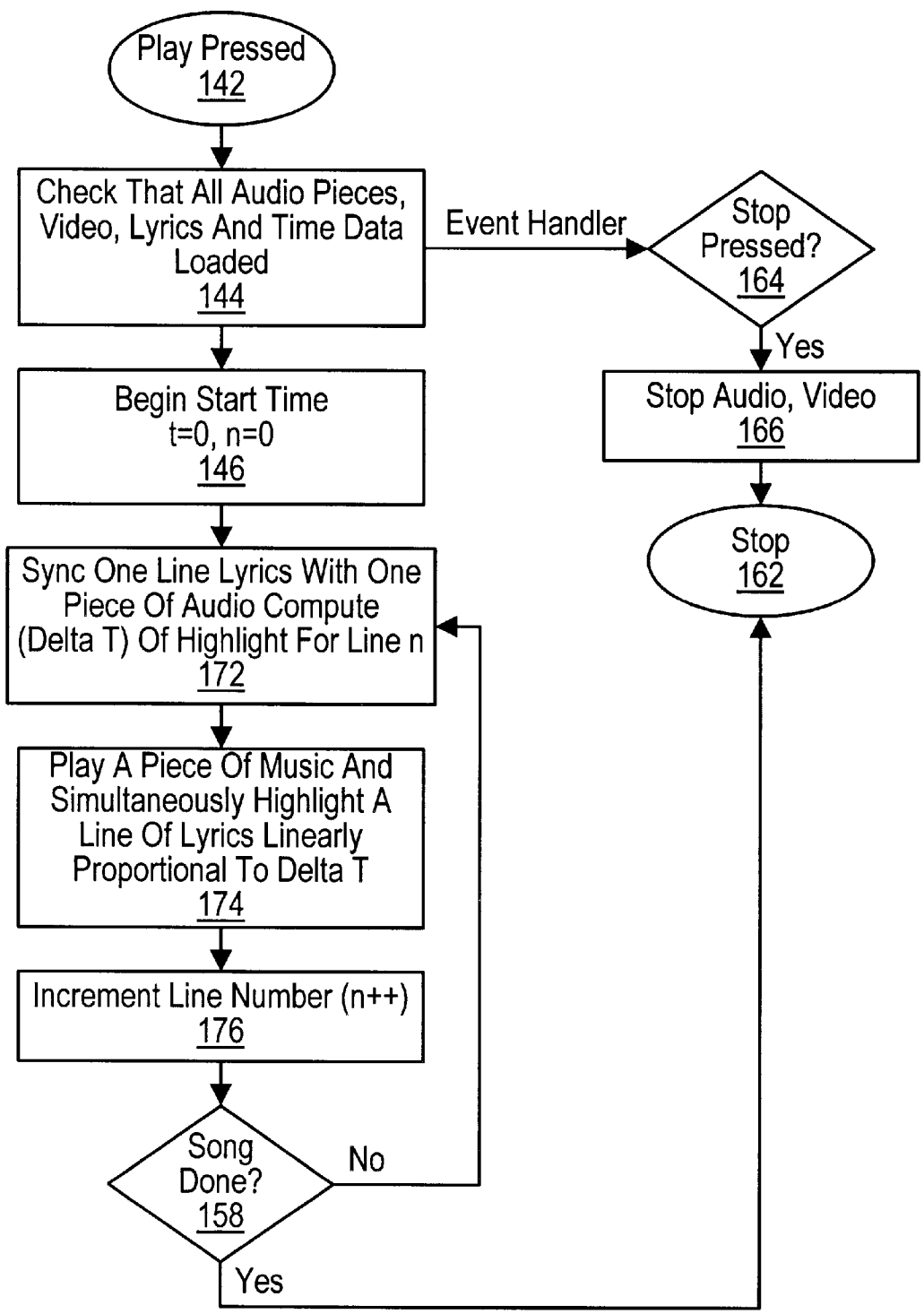
FIG. 9 is a flow chart illustrating another method of synchronization of multimedia elements.
Figure 10:
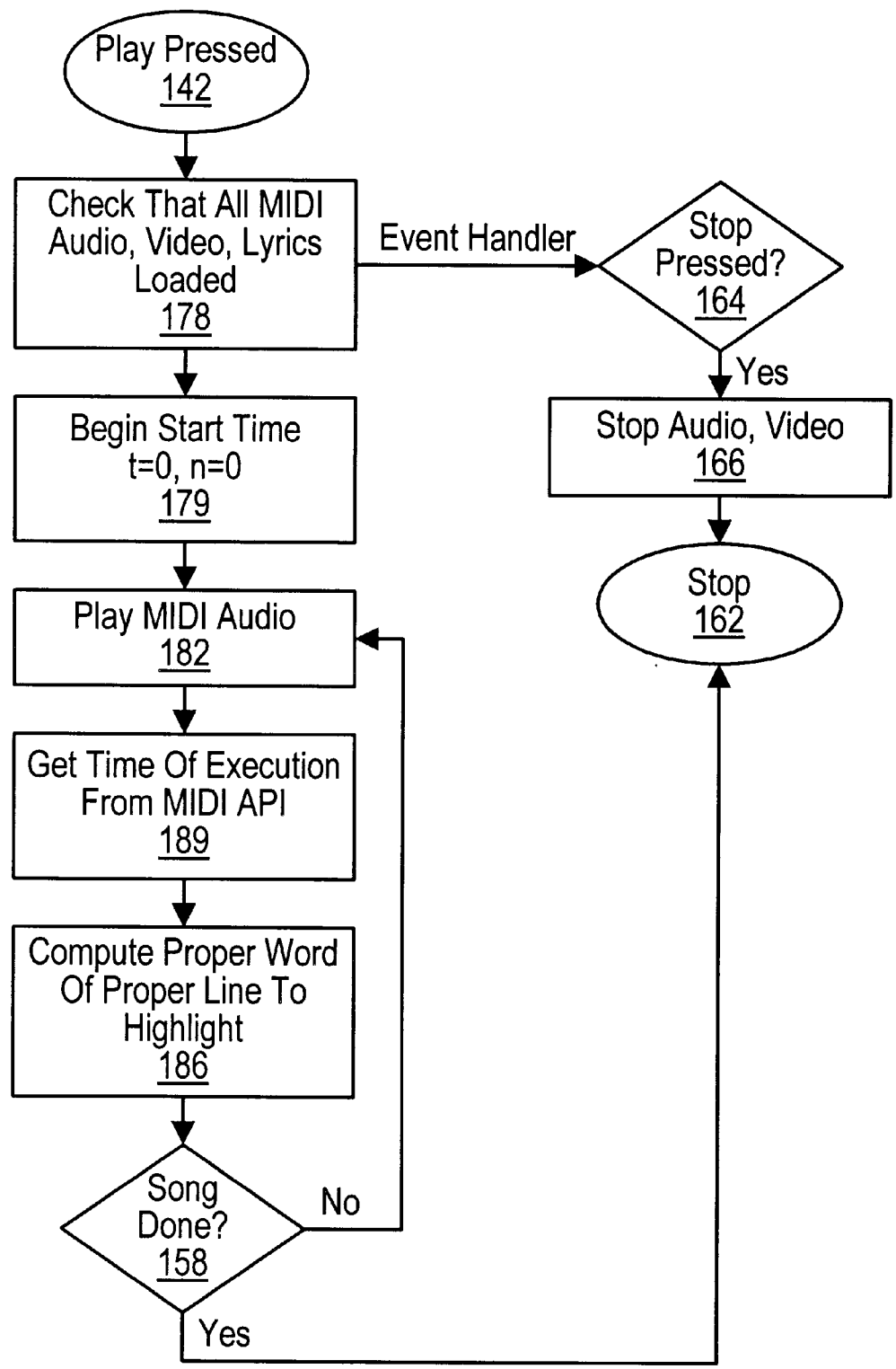
FIG. 10 is a flow chart illustrating yet another method of synchronization of multimedia elements according to this invention.

When a song begins to play, the start time is t=0 and the increment number is n=0 at box 146. The increment number is equal to the ASCII line number. An additional variable, x, represents the graphical output for highlighting and is linear with t and n. At this time, the audio, video and lyrics begin to playback on separate threads of control at box 148. A computation is then made to compute the beginning and the ending time (delta T) of the highlight for an ASCII line associated with n at box 152 so that the highlight of a line of lyrics is simultaneously provided in a manner linearly proportional to delta T at box 154. To move onto the next line number, increment line number (n++) at box 156. For each line n highlighted, a data block of audio n is played. After a sufficient number of increments of n, the system asks whether the song is done at box 158. If it is, the play stops at box 162. If the song is not done, it loops back to box 152. Alternatively, if stop had been pressed at any time at box 164, the audio and video would stop at box 166.

Where it is possible to fragment the audio ASCII and graphical highlighting into pieces, synchronization between lyric highlighting and the words playing is better enabled. The increment number n counts the data fragments. The data is fragmented into equal sized data blocks, each having a delivery time equal to T. Turning to FIG. 9, in this way, at box 172, one line of lyrics is fragmented so that it is in sync with one piece of the audio component (delta T) so that the synchronization of the two takes effect for that particular delta T. Additionally, the graphical output x is also fragmented to match word for word the audio output with the ASCII output. At box 174, the content is delivered accordingly. At box 176, the line is incremented by one fragment and the process returns to box 172 until the song is completed. In this way, if there is a defect in the data producing the equivalent of a skip in the music, then the timing will still be re-synchronized at the next t=0.

Where the MIDI standard is incorporated into the timing process of this invention as shown in FIG. 10, at box 178 the system checks that all the MIDI audio, video, lyrics and graphics are loaded (no separate timing data thread is needed). The process begins at t=0 and n=0 at box 179 where n is defined by the MIDI standard. At box 182, the MIDI audio is played and the time of execution is retrieved from MIDI API at box 184. Accordingly, the proper word of proper line to highlight is computed by MIDI algorithms at box 186. If the song is done, the system ends the procedure. If not, the system loops back to box 182.

Accordingly, a seamless multimedia experience is provided in that each elements' timing is coordinated with the other elements' timing. According to this invention, an applet can include multimedia elements which include timing codes or the data can be configured as per a standard like MIDI for the synchronized delivery of the multimedia elements. Applications for this invention include noise dependent games (such as mechanical, such as panchiko or video games, such as Pacman or SkyBlaster) or customizable games, where the visual aspects of the game must be synchronized with the visual components to resemble mechanical variations of the game. For example, the visual components of the game panchiko include metal balls which move in a vertical fashion, their clanking representable by synchronized audio components. In such a case the variables discussed in reference to FIG. 9 would include audio, visual and ASCII as well which is preprogrammed to represent output based on a user's input (game playing). Moreover, other gambling games such as slot machines may be implemented in accordance with this invention where the mechanical operation is visual component and the associated mechanical noises are the audio components. The ASCII data is in the form, for example, of winnings which could be applied as a credit to one's credit card or PCMCIA-based card or smart card.

Server systems and subsystems incorporating features of this invention can be implemented entirely in hardware, or in a combination of hardware and software (i.e., program modules stored in memory). For example, the browser embedded component or applet can be implemented entirely in software. Suitable media for server software include, for example, magnetic media 80 (See FIG. 1) (e.g., disks and tapes), optical media (e.g., CD-ROMs), DRAMs and SRAMs. In addition, software can either be pre-loaded into the server system or loaded by the user electronically with or without the use of tangible storage media, e.g., by downloading program modules to the user's server from ftp/telnet or html sites on the Internet or WorldWide Web, respectively.

Thus, program modules incorporating features of the invention can be conveniently distributed by CD-ROM, for example, or by accessing a Web site. In the latter case, the modules are typically loaded temporarily from permanent storage into RAM and/or output buffers of the Web server; i.e., these are the media serving to store and distribute the program modules of the invention whenever a download request is made. After loading into RAM, the Web server transmits the program modules to the user's host.

I claim:

1. A system for providing on-line multimedia content output to a user on said user's computer system, comprising:

a browser configured to provide access to a page and at least one component, wherein said at least one component has multimedia audio, graphics, text and timing data elements, wherein said at least one component further includes instructions which when executed synchronize the delivery of said multimedia data elements, and wherein said at least one component further includes encrypted data and unencrypted data and authentication instructions executable with respect thereto;

a display unit configured to display said unencrypted data in a manner which enables said user to make a multimedia content output choice;

an output unit configured to generate on said display unit a representation of unencrypted data in a manner which enables said user to make a multimedia content output choice and an authentication request;

a processor configured to generate said multimedia content output choice and said authentication request;

an execution unit configured to execute said authentication request in order to provide a disposable key to decrypt some of said encrypted data to generate multimedia content output therefrom;

a receiver configured to receive said authentication request and to provide said disposable key to decrypt said some of said encrypted data to generate said multimedia content therefrom;

a processor configured to receive said disposable key and to decrypt said some of said encrypted data to generate said multimedia content therefrom while said disposable key is valid;

a transmitter configured to automatically download said at least one component to said user's computer system including a display apparatus; and an execution unit configured to execute said instructions to generate said multimedia content output including audio output from said audio element, text output from said text data element and graphics output from said graphics data element, said text output and said graphics output being displayed on said display apparatus of said user's computer system, the combination of which being delivered in a manner synchronized with said audio output in accordance with said timing data element.

2. A system as recited in claim 1 wherein said audio output is in the form of a song having words.

3. A system as recited in claim 2 wherein said text output is in the form of ASCII words.

4. A system as recited in claim 3 wherein said graphics output is in the form of highlights on said words which are displayed on said display apparatus in a synchronized manner with said audio output words in accordance with said timing element.

5. A system as recited in claim 2 wherein said text output is in the form of international multi-byte fonts.

6. A system as recited in claim 1 wherein said graphics output is in the form of a panchiko game having metal balls which is displayed on said display apparatus.

7. A system as recited in claim 6 wherein said audio output is resembles the sound of metals balls clanging, such audio output delivered in a synchronized manner with said graphics output in accordance with said timing element.

8. A system as recited in claim 1 wherein said audio data element is fragmented into audio fragments having delta time in length and wherein said text data element is fragmented into text fragments having delta time in length, said system further comprising:

a generator configured to generate simultaneous output of audio fragments and text fragments at the beginning of said delta time.

9. A system as recited in claim 1 wherein said component is an applet.

10. A system as recited in claim 1 wherein said text output further includes a list of songs from which a user can choose, and wherein said execution unit is further configured to allow said user to choose songs from said list so that said delivery of said songs' multimedia data elements is queued for sequential delivery.

11. A system as recited in claim 1 wherein said disposable key is only valid for a predetermined period of time.

12. A method for providing on-line multimedia content output to a user on said user's computer system, comprising the steps of:

via a browser, providing access to a page and at least one component, wherein said at least one component has a plurality of elements including multimedia audio, graphics, text and timing data elements, wherein said at least one component further includes instructions which when executed synchronize the delivery of said multimedia content data elements to said user's computer system, and wherein said at least one component further includes encrypted data and unencrypted data and authentication instructions executable with respect thereto;

automatically downloading said at least one component to said user's computer system;

displaying unencrypted data in a manner which enables said user to make a multimedia content output choice;

generating on said display apparatus a representation of said unencrypted data in a manner which enables said user to make a multimedia content choice and an authentication request;

generating said multimedia content output choice and said authentication request;

executing said authentication request in order to provide a disposable key to decrypt some of said encrypted data to generate said multimedia content output therefrom;

receiving authentication in response to said authentication request, including said disposable key to decrypt said some of said encrypted data to generate said multimedia content therefrom while said disposable key is valid;

decrypting said some of said encrypted data to generate said multimedia content therefrom while said disposable key is valid; and executing said instructions to generate multimedia content output including audio output from said audio data element in the form of a song having words, text output from said text data element being displayed on a display apparatus and graphics output from said graphics data element being displayed on said display apparatus in the form of highlights on said text in a synchronized manner with said audio output in accordance with said timing data element.

13. A method as recited in claim 12 wherein said audio data element is fragmented into audio fragments having delta time in length and wherein said text data element is fragmented into text fragments having delta time in length, said method further comprising the step of:

simultaneously outputting said audio fragments and text fragments at the beginning of said delta time.

14. A method as recited in claim 12 wherein said text output is in the form of ASCII words.

15. A method as recited in claim 12 wherein said text output is in the form of international multi-byte fonts.

16. A browser embedded component, comprising:

multimedia audio, graphics, text and timing data elements;

instructions which when executed synchronize the delivery of said multimedia data elements;

encrypted data and unencrypted data and authentication instructions executable thereto;

a first execution element configured to display on a display apparatus said unencrypted data in a manner which enables a user to make a multimedia content output choice, to generate on said display apparatus a representation of said unencrypted data in a manner which enables said user to make a multimedia content choice and an authentication request, to generate said multimedia content output choice and said authentication request in order to request a disposable key to decrypt some of said encrypted data to generate said multimedia content therefrom; and a second execution element configured to receive said disposable key to decrypt said some of said encrypted data to generate said multimedia content therefrom while said disposable key is valid, to decrypt said some of said encrypted data to generate said multimedia content therefrom while said disposable key is valid, and to execute said instructions to generate multimedia content output including audio output from said audio data element, text output from said text data lament and graphics output from said graphics data element, said text output and said graphics output being configured for display on said display apparatus, the combination of which being delivered a synchronized manner with said audio output in accordance with said timing data element.

17. An embedded component as recited in claim 16 wherein said audio output when generated is in the form of a song having words.

18. An embedded component as recited in claim 16 wherein said text output when executed is in the form of ASCII words.

19. An embedded component as recited in claim 16 wherein said text output is in the form of international multi-byte fonts.

20. An embedded component as recited in claim 16 wherein said graphics output when executed is in the form of highlights on said text output which are configured to be displayed on a display apparatus in a synchronized manner with said audio output words in accordance with said timing element.

21. An embedded component as recited in claim 16 wherein said graphics output when executed is in the form of a panchiko game having metal balls which is configured to be displayed on a display apparatus.

22. An embedded component as recited in claim 16 wherein said audio output when executed resembles the sound of metals balls clanging, such audio output delivered in a synchronized manner with said graphics output in accordance with said timing element.

23. An embedded component as recited in claim 16 wherein said audio data element is fragmented into audio fragments having delta time in length and wherein said text data element is fragmented into text fragments having delta time in length, said component further comprising:
an execution unit configured to provide the simultaneous output of audio fragments and text fragments at the beginning of said delta time.

24. A browser embedded component as recited in claim 16 wherein said disposable key is only valid for a predetermined period of time.

25. A system for providing on-line multimedia content output to a user on said user's computer system, comprising:
browser means for providing access to a page and at least one component, wherein said at least one component has a plurality of elements including multimedia audio, graphics, text and timing data elements, wherein said at least one component further includes instructions which when executed synchronize the delivery of said multimedia content data elements to said user's computer system, and wherein said at least one component further includes encrypted data and unencrypted data and authentication instructions executable with respect thereto;
downloading means for automatically downloading said at least one component to said user's computer system;
display means for displaying unencrypted data in a manner which enables said user to make a multimedia content output choice;
first generating means for generating on said display apparatus a representation of said unencrypted data in a manner which enables said user to make a multimedia content choice and an authentication request;
second generating means for generating said multimedia content output choice and said authentication request;
first executing means for executing said authentication request in order to provide a disposable key to decrypt some of said encrypted data to generate said multimedia content output therefrom;
receiving means for receiving authentication in response to said authentication request, including said disposable key to decrypt said some of said encrypted data to generate said multimedia content therefrom while said disposable key is valid;
decrypting means for decrypting said some of said encrypted data to generate said multimedia content therefrom while said disposable key is valid; and
second executing means for executing said instructions to generate multimedia content output including audio output from said audio data element, text output from said text data element and graphics output from said graphics data element, said text output and said graphics output being delivered in a synchronized manner with said audio output in accordance with said timing data element.

26. A system as recited in claim 25 wherein said graphics output is in the form of highlights on words of said text output which are configured to be displayed on said display apparatus in said synchronized manner with words of said audio output in accordance was said timing data element.

27. A system as recited in claim 25 wherein said audio data element is fragmented into audio fragments having delta time in length and wherein said text data element is fragmented into text fragments having delta time in length, said system further comprising:
output means for the simultaneous output of audio fragments and text fragments at the beginning of said delta time.

28. A system as recited in claim 25 wherein said text output further includes a list of songs from which a user can choose, and wherein said execution means further executed instruction which allow said user to choose songs from said list so that said delivery of said songs' multimedia data elements is queued for sequential delivery.

29. A server, comprising:
a storage unit configured to store a browser embedded component including:
multimedia audio, graphics, text and timing data elements;
instructions which when executed synchronize the delivery of said multimedia data elements;
encrypted data and unencrypted data and authentication instructions executable thereto;
a first execution element configured to display on a display apparatus said unencrypted data in a manner which enables a user to make a multimedia content output choice, to generate on said display apparatus a representation of said unencrypted data in a manner which enables said user to make a multimedia content choice and an authentication request, to generate said multimedia content output choice and said authentication request in order to request a disposable key to decrypt some of said encrypted data to generate said multimedia content therefrom; and
a second execution element configured to receive said disposable key to decrypt said some of said encrypted data to generate said multimedia content therefrom while said disposable key is valid, to decrypt said some of said encrypted data to generate said multimedia content therefrom while said disposable key is valid, and to execute said instructions to generate multimedia content output including audio output from said audio data element, text output from said text data lament and graphics output from said graphics data element, said text output and said graphics output being configured for display on said display apparatus, the combination of which being delivered a synchronized manner with said audio output in accordance with said timing data element; and a transmitter configured to transmit said browser embedded component from said storage unit to a remote computer system.

30. A server as recited in claim 29 wherein upon execution by said second execution element, said graphics output is in the form of highlights on words of said text output which are configured to be displayed on said display apparatus in said synchronized manner with words of said audio output in accordance was said timing data element.

31. A server as recited in claim 29 wherein said audio data element is fragmented into audio fragments having delta time in length and wherein said text data element is fragmented into text fragments having delta time in length wherein said execution element further comprises:

a generator configured to generate simultaneous output of audio fragments and text fragments at the beginning of said delta time.

32. A server as recited in claim 29 wherein said disposable key is only valid for a predetermined period of time.

33. A computer system, comprising:

a transmission reception unit configured to receive data and instructions from a remote source; and a storage unit configured to store said data and instructions which are a part of a browser embedded component which is automatically downloaded thereto upon access to a page provided on said remote source, said browser embedded component including:

multimedia audio, graphics, text and timing data elements;

instructions which when executed synchronize the delivery of said multimedia data elements;

encrypted data and unencrypted data and authentication instructions executable thereto;

a first execution element configured to display on a display apparatus said unencrypted data in a manner which enables a user to make a multimedia content output choice, to generate on said display apparatus a representation of said unencrypted data in a manner which enables said user to make a multimedia content choice and an authentication request, to generate said multimedia content output choice and said authentication request in order to request a disposable key to decrypt some of said encrypted data to generate said multimedia content therefrom; and a second execution element configured to receive said disposable key to decrypt some of said encrypted data to generate said multimedia content therefrom while said disposable key is valid, to decrypt said some of said encrypted data to generate said multimedia content therefrom while said disposable key is valid, and to execute said instructions to generate multimedia content output including audio output from said audio data element, text output from said text data lament and graphics output from said graphics data element, said text output and said graphics output being configured for display on said display apparatus, the combination of which being delivered a synchronized manner with said audio output in accordance with said timing data element.

34. A computer system as recited in claim 33 wherein upon execution by said second execution element, said graphics output is in the form of highlights on words of said text output which are configured to be displayed on said display apparatus in said synchronized manner with words of said audio output in accordance was said timing data element.

35. A computer system as recited in claim 33 wherein said audio data element is fragmented into audio fragments having delta time in length and wherein said text data element is fragmented into text fragments having delta time in length wherein said execution element further comprises:

a generator configured to generate simultaneous output of audio fragments and text fragments at the beginning of said delta time.

36. A computer system as recited in claim 33 wherein said browser embedded component is an applet.

37. A computer-readable medium having computer readable code stored therein, comprising:

a computer-readable code module configured to store multimedia audio, graphics, text and timing data elements;

instructions which when executed synchronize the delivery of said multimedia data elements;

encrypted data and unencrypted data and authentication instructions executable thereto; and configured to display on a display apparatus said unencrypted data in a manner which enables a user to make a multimedia content output choice, to generate on said display apparatus a representation of said unencrypted data in a manner which enables said user to make a multimedia content choice and an authentication request, to generate said multimedia content output choice and said authentication request in order to request a disposable key to decrypt some of said encrypted data to generate said multimedia content therefrom; to receive said disposable key to decrypt said some of said encrypted data to generate said multimedia content therefrom while said disposable key is valid, to decrypt said some of said encrypted data to generate said multimedia content therefrom while said disposable key is valid, and configured to execute said instructions to generate multimedia content output including audio output from said audio data element, text output from said text data lament and graphics output from said graphics data element, said text output and said graphics output being configured for display on said display apparatus, the combination of which being delivered a synchronized manner with said audio output in accordance with said timing data element.

38. A computer readable medium as recited in claim 37 wherein said audio output when generated is in the form of a song having words.

39. A computer readable medium as recited in claim 37 wherein said text output when executed is in the form of ASCII words.

40. A computer readable medium as recited in claim 37 wherein said text output is in the form of Japanese characters.

41. A computer readable medium as recited in claim 37 wherein said graphics output when executed is in the form of highlights on said text output which are configured to be displayed on a display apparatus in a synchronized manner with said audio output words in accordance with said timing element.

42. A computer readable medium as recited in claim 37 wherein said graphics output when executed is in the form of a panchiko game having metal balls which is configured to be displayed on a display apparatus.

43. A computer readable medium as recited in claim 37 wherein said audio output when executed resembles the sound of metals balls clanging, such audio output delivered in a synchronized manner with said graphics output in accordance with said timing element.

44. A computer readable medium as recited in claim 37 wherein said audio data element is fragmented into audio fragments having delta time in length and wherein said text data element is fragmented into text fragments having delta time in length, said component further comprising:

an execution unit configured to provide the simultaneous output of audio fragments and text fragments at the beginning of said delta time.

45. A computer-readable medium as recited in claim 37 wherein said disposable key is only valid for a predetermined period of time.

* * * * *